(12) United States Patent
Wied et al.

(10) Patent No.: US 11,720,894 B2
(45) Date of Patent: *Aug. 8, 2023

(54) SYSTEMS AND METHODS FOR EXECUTING REAL-TIME RECONCILIATION AND NOTIFICATION OF ELECTRONIC TRANSACTIONS

(71) Applicant: Fidelity Information Services, LLC, Jacksonville, FL (US)

(72) Inventors: William J. Wied, Austin, TX (US); Aman S. Cheema, Warwickshire (GB); Manuela Dragan, Westfield, NJ (US); Stephen E. Dinan, Austin, TX (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,504

(22) Filed: Nov. 15, 2022

(65) Prior Publication Data

US 2023/0072365 A1 Mar. 9, 2023

Related U.S. Application Data

(63) Continuation of application No. 17/337,701, filed on Jun. 3, 2021.

(51) Int. Cl.
*G06Q 20/38* (2012.01)
*G06F 16/2452* (2019.01)
(Continued)

(52) U.S. Cl.
CPC ....... *G06Q 20/389* (2013.01); *G06F 16/2308* (2019.01); *G06F 16/2452* (2019.01); *G06Q 20/401* (2013.01)

(58) Field of Classification Search
None
See application file for complete search history.

(56) References Cited

U.S. PATENT DOCUMENTS 7,164,676 B1 * 1/2007 Chakraborty ....... G06F 16/2386
709/213
10,693,658 B2 * 6/2020 Jacobs ................. H04L 9/3247
(Continued)

OTHER PUBLICATIONS

"Payment API: A Guide for Developers, https://cardconnect.com/launchpointe/isv-growth/guide-for-developers, Jan. 15, 2020" (Year: 2020).*

(Continued)

*Primary Examiner* — Kito R Robinson
*Assistant Examiner* — Toan Duc Bui
(74) *Attorney, Agent, or Firm* — Bookoff McAndrews, PLLC

(57) ABSTRACT

Systems and methods of executing a real-time electronic transaction by a real-time transaction system are disclosed. One the method includes receiving, by a reconciliation system, a transaction update associated with a transaction request from a transaction network. The reconciliation system may authenticate the transaction update by communicating with an authentication system. The reconciliation system may translate the transaction update into at least another format. The reconciliation system may transmit the transaction update to a notification handler. The reconciliation system may receive transaction data associated with the transaction update from a transaction query system. The reconciliation system may transmit the transaction update to a transaction requestor associated with the transaction data.

20 Claims, 10 Drawing Sheets

(51) Int. Cl.
*G06Q 20/40* (2012.01)
*G06F 16/23* (2019.01)

(56) References Cited

U.S. PATENT DOCUMENTS

| | | | |
|---|---|---|---|
| 11,171,911 B2* | 11/2021 | Schnitt | G06F 16/258 |
| 2004/0199470 A1* | 10/2004 | Ferry, Jr. | G06Q 20/40 |
| | | | 705/16 |
| 2017/0149740 A1* | 5/2017 | Mansour | H04L 63/045 |
| 2018/0218370 A1* | 8/2018 | Denton | G06Q 20/12 |
| 2021/0350382 A1* | 11/2021 | Lopes | G06N 3/045 |
| 2022/0129852 A1* | 4/2022 | Prados | H04L 9/0866 |
| 2022/0215392 A1* | 7/2022 | Wied | G06F 9/547 |

OTHER PUBLICATIONS

"June Blender, AWS Encryption SDK: How to decide if Data Key Catching is Right for Your Application, Aug. 2017" (Year: 2017).

* cited by examiner

| HOME | DASHBOARD | SUPPORT | PRICING | | | LOGOUT |

TRANSACTIONS — 802

| | | |
|---|---|---|
| DARK MODE | 10/01/2020 ▼ THROUGH 10/30/2020 ▼ | 🔗 LINK LABEL  🔗 LINK LABEL  (MAKE A PAYMENT) |
| ACCOUNT 1234 ▼ | | |
| MY TASKS | FAILED TRANSACTIONS (2) | |
| TRANSACTION ACTIVITY | 1  ⚠ DUE BY 10/30/2020    $100,000 | TO JOHN JACKSON | INITIATED 10/28/2020 | TYPE REAL TIME | |
| REPORTS | 2  ⚠ DUE BY 10/30/2020    $1,234,000 | TO SARAH SMITH | INITIATED 10/28/2020 | TYPE ACH | |
| RECEIVER ACCOUNTS | REJECTED TRANSACTIONS (4) | |
| SENDER ACCOUNTS | 3  ⊘ DUE BY 10/30/2020    $30,000 | TO JOHN JACKSON | INITIATED 10/28/2020 | TYPE REAL TIME | |
| PROFILE SETTINGS | 4  ⊘ DUE BY 10/30/2020    $124,000 | TO ASHLEY ADAMS | INITIATED 10/28/2020 | TYPE ACH | |
| | 5  ⊘ DUE BY 10/30/2020    $634,000 | TO KIMBERLY RAY | INITIATED 10/29/2020 | TYPE ACH | |
| | 6  ⊘ DUE BY 10/30/2020    $4,154,000 | TO SARAH SMITH | INITIATED 10/29/2020 | TYPE ACH | |
| | MY PENDING TRANSACTIONS (6)    VIEW ALL | |
| | 11  ⊙ DUE BY 11/5/2020    $400,000 | TO SAM SMITH | INITIATED 10/15/2020 | TYPE ACH | |
| | 12  ⊙ DUE BY 11/5/2020    $51,000,000 | TO JOHN JACKSON | INITIATED 10/15/2020 | TYPE ACH | |
| | 13  ⊙ DUE BY 11/5/2020    $25,000 | TO JOHN JACKSON | INITIATED 10/15/2020 | TYPE REAL TIME  (EDIT)(CANCEL) | |
| | 14  ⊙ DUE BY 11/5/2020    $124,200 | TO SARAH SMITH | INITIATED 10/21/2020 | TYPE REAL TIME  (EDIT)(CANCEL) | |
| | 15  ⊙ DUE BY 11/9/2020    $8,000 | TO JESSICA SWAIN | INITIATED 10/25/2020 | TYPE SAME DAY ACH  (EDIT)(CANCEL) | |
| | SETTLED (88)   VIEW ALL | |
| | 17  ☑ SETTLED 10/30/2020    $123,000 | TO SARAH SMITH | INITIATED 10/22/2020 | TYPE REAL TIME | |

*FIG. 8*

SYSTEMS AND METHODS FOR EXECUTING REAL-TIME RECONCILIATION AND NOTIFICATION OF ELECTRONIC TRANSACTIONS

CROSS REFERENCE TO RELATED APPLICATION(S)

This application is a continuation of U.S. patent application Ser. No. 17/337,701, filed Jun. 3, 2021, which is incorporated herein in its entirety by this reference.

TECHNICAL FIELD

The present disclosure relates generally to the field of electronic transactions and, more particularly, to systems and methods for executing real-time reconciliation and notification of electronic transactions.

BACKGROUND

Businesses, merchants, consumers, financial entities, and/or government entities may perform electronic fund transfers, payment processing (e.g., e-commerce payments), capital management, etc. domestically and internationally over various payment networks. However, many aspects of the existing electronic payment/fund transaction technology involve some inherent deficiencies or shortcomings that may lead to poor user experience, increased time and costs, and other inconveniences when sending payments electronically across various payment networks. For example, many legacy payment processing networks involve a patchwork of processing systems, fragmented systems, security risks, and the like. The present disclosure is directed to addressing these and other drawbacks to the existing electronic transaction systems and services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a method of executing a real-time electronic transaction by a real-time transaction system, the method comprising: receiving, by a reconciliation system, a transaction update associated with a transaction request from a transaction network; authenticating, by the reconciliation system, the transaction update by communicating with an authentication system; translating, by the reconciliation system, the transaction update into at least another format; transmitting, by the reconciliation system, the transaction update to a notification handler; receiving, by the reconciliation system, transaction data associated with the transaction update from a transaction query system; and transmitting, by the reconciliation system, the transaction update to a transaction requestor associated with the transaction data.

One embodiment provides a real-time transaction system comprising: one or more computer readable media storing instructions for executing a real-time electronic transaction; and one or more processors configured to execute the instructions to perform operations comprising: receiving, by a reconciliation system, a transaction update associated with a transaction request from a transaction network; authenticating, by the reconciliation system, the transaction update by communicating with an authentication system; translating, by the reconciliation system, the transaction update into at least another format; transmitting, by the reconciliation system, the transaction update to a notification handler; receiving, by the reconciliation system, transaction data associated with the transaction update from a transaction query system; and transmitting, by the reconciliation system, the transaction update to a transaction requestor associated with the transaction data.

One embodiment provides a non-transitory computer-readable medium storing instructions for executing a real-time transaction, the instructions, when executed by one or more processors, causing the one or more processors to perform operations comprising: receiving, by a reconciliation system, a transaction update associated with a transaction request from a transaction network; authenticating, by the reconciliation system, the transaction update by communicating with an authentication system; translating, by the reconciliation system, the transaction update into at least another format; transmitting, by the reconciliation system, the transaction update to a notification handler; receiving, by the reconciliation system, transaction data associated with the transaction update from a transaction query system; and transmitting, by the reconciliation system, the transaction update to a transaction requestor associated with the transaction data.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 8 illustrates an exemplary user interface, according to one aspect of the present disclosure.

DETAILED DESCRIPTION OF EMBODIMENTS

Figure 1:
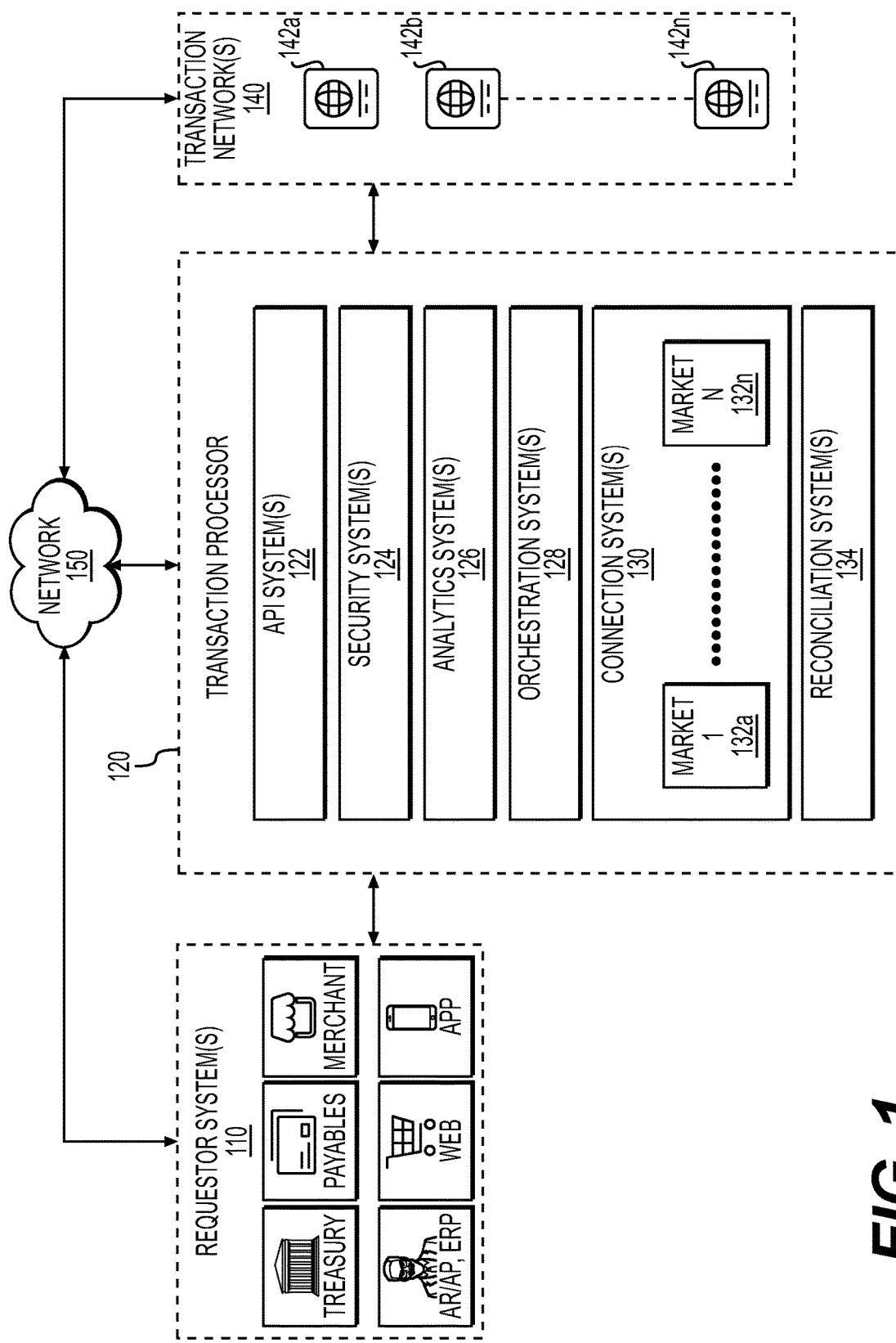
FIG. 1 depicts a block diagram of an exemplary electronic transaction system, according to one aspect of the present disclosure.

The following embodiments describe systems and methods for facilitating electronic transactions. More particularly, the embodiments contemplated in the present disclosure may enable merchants, customers, businesses, institutions, etc. to utilize a single transaction processor that may communicate with transaction requestors and transaction networks in order to facilitate various electronic transactions.

As discussed above, various aspects of the existing electronic payment technology involve certain drawbacks and deficiencies in executing payment transactions domestically and/or internationally. For example, the patchwork of complex legacy systems and evolving solutions, the maze of compliance standards across various markets and payment methods, and arbitrary transaction pricing strategies may lead to slow and unreliable transactions as well as increased costs and poor user experience.

To address the above-noted problems, the present disclosure describes systems and methods that provide a unified platform that facilitates or provides, for example: 1) a singular application programming interface (API) to all account-to-account payment methods; 2) managing consistent and globally accepted security and privacy practices; 3) intelligent payment routing and orchestration capabilities; 4) unified reconciliation and reporting across payment methods and schemes; and 5) a single management portal which may provide management of an entire customer lifecycle. For example, a transaction processor including an API system(s), a security system(s), an analytics system(s), an orchestration system(s), a connection systems(s), and a reconciliation system(s) may communicate with a requestor system(s) and transaction network(s) to facilitate and execute electronic transactions of the present disclosure.

In one embodiment, the transaction processor of the present disclosure may receive, via the API system, an electronic transaction request (e.g., an account-to-account fund transfer, purchase payment, reimbursements, etc.) from a user (e.g., a business, merchant, consumer, financial institutions, government institutions, etc.). The API system may then transmit the electronic transaction request to the choreographer system of the transaction processor. The choreographer system may then transmit the electronic transaction request to at least one of a routing system, an account ledger system, an auditing system, and/or a transaction system of the transaction processor. The routing system may determine an optimal path for executing the electronic transaction in accordance with a routing decision model and the routing configuration data. The routing system may then transmit the electronic transaction request to a transaction network via the optimal path. After the routing system transmits the electronic transaction request to the transaction network, a reconciliation system may receive notifications, messages, and/or acknowledgements from the transaction network. The reconciliation system may then transmit appropriate messages, notifications, and/or signals associated with the electronic transaction request to the user.

In one embodiment, the reconciliation system may receive a transaction update (or notification) from the transaction network. The reconciliation system may then authenticate the transaction update by communicating with an authentication system. Additionally, the reconciliation system may translate the transaction update into a generic format compatible with the transaction processor. The reconciliation system may then transmit the transaction update to a notification handler. Further, the reconciliation system may receive transaction data associated with the transaction update from a transaction query system. The reconciliation system may then transmit the transaction update to the user (or a transaction requestor) associated with the transaction data. Accordingly, one or more users or payment transaction requestors may keep track of the transaction request. That is, the user may be provided with the status of the requested transaction (or payment request) in real-time throughout the transaction process and until the transaction is complete.

It should be appreciated that particular consideration is made herein to payment transactions relating to businesses, merchants, and/or consumers. Despite this reference to payment transactions relating to businesses, merchants, and or consumers, certain disclosed systems and methods may apply equally well to various other e-commerce and electronic transactions. Effectively, any circumstance where credit, currency, crypto currency, collateralized funds, smart contracts, and/or tokenized funds thereto, is being transmitted over a network, systems and methods disclosed herein may be employed. Further, while the party seeking to initiate an electronic transaction and/or provide a third-party service may be referred to herein as a business, a merchant, or a consumer, a party seeking to initiate an electronic transaction need not be a business, a merchant, or a consumer, but may be a financial institution, a government institution, a service provider, a user, or any party seeking to execute an electronic transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary system 100 including a requestor system(s) 110, a transaction processor 120, and a transaction network(s) 140. The requestor system(s) 110, the transaction processor 120, and the transaction network(s) 140 may be in communication with each other directly, indirectly, and/or via a network 150 (e.g., the Internet and/or one or more cloud networks). The requestor system(s) 110, the transaction processor 120, and the transaction network(s) 140 may also be in communication with each other directly via direct lines of communication, via combinations of physical, technological, and/or business relationships. The requestor system(s) 110 may include one more entities, for example, but not limited to, treasury, merchants, consumers, businesses, financial institutions, government institutions, etc. The requestor system(s) 110 may transmit, for example, a request to transmit electronic funds to one or more receivers.

In one embodiment, the requestor system(s) 110 may be configured to facilitate a business requesting to transmit electronic funds to a consumer. In this embodiment, the electronic funds may include, for example, legal settlements, insurance claims, shareholder dividends, loyalty payments, loans, investment disbursements, customer refund pay-outs, etc. In another embodiment, the requestor system(s) 110 may be configured to facilitate a business requesting to transmit electronic funds to another business. In this embodiment, the electronic funds may include, for example, accounts receivables/payables (AR/AP), rent payments, business loan payments, payroll, bank-to-bank cross border payments, supplier payments, freelancer disbursements, supply chain finance disbursements, business medical benefits disbursements, affiliate marketing programs disbursements, etc. In another embodiment, the requestor system(s) 110 may be configured to facilitate a consumer requesting to transmit electronic payments to a business (or a merchant). In this embodiment, the electronic payments may include, for example, payments at point of sale terminals, payments at eCommerce checkouts, online marketplace payments, online digital content payments, sports wagering payments, telecommunication bill payments, utilities payments, rent payments, investment payments, etc. In another embodiment, the requestor system(s) 110 may be configured to facilitate a user (e.g., any individual or consumer) requesting to transmit electronic funds to another user. In this embodiment, the electronic funds may include, for example, crowdfunding payments, mobile wallet payments, gift payments, person-to-person payments, account-to-account transfers, etc. In another embodiment, the requestors system(s) 110 may be configured to facilitate a government entity requesting to transmit electronic funds to a consumer. In this embodiment, the electronic funds may include, for example, government benefits payments, student aid payments, tuition payments, tuition reimbursement payments, etc. In another, the requestors system(s) 110 may be configured to facilitate a user or consumer requesting to transmit electronic payments to a government entity. In this embodiment, the electronic funds may include, for example, transit payments, parking payments, tax payments, permit payments, payroll payments, etc.

In one embodiment, the requestor system(s) 110 may utilize an integration portal (or platform) and/or integration services provided by the transaction processor 120 for integrating user experience and/or user interfaces (e.g., AR/AP, Enterprise Resource Planning (ERP) system, a website, an app, etc.) for interacting with the transaction processor 120. In some embodiments, the requestor system(s) 110 may be integrated with the transaction processor 120 by using integration tool kits/services and/or a do-it-yourself (DIY) model utilizing the API system(s) 122 of the transaction processor 120.

Still referring to FIG. 1, the transaction processor 120 may include an application programming interface (API) system(s) 122 (e.g., an API gateway), a security system(s) 124, an analytics system(s) 126, an orchestration system(s) 128, a connection system(s) 130, and a reconciliation system(s) 134. The connection system(s) 130 may be configured to communicate with various markets domestically and/or internationally (e.g., Markets 1-N 132a-132n). The transaction processor 120 may be configured to facilitate electronic transactions and communications between the requestor system(s) 110 and the transaction network(s) 140. For example, the API system(s) 122 may receive one or more requests to transfer funds (or payments) electronically from the requestor system(s) 110 via an API (e.g., a representational state transfer (RESTful) real-time API or file-based batch API) of the transaction processor 120. The RESTful API (or API) may be accessed over one or more public Hypertext Transfer Protocol Secure (HTTPS) endpoints. The batch API (or API) may be accessed over one or more public Secure File Transfer Protocol (SFTP) endpoints. The API may include capabilities to create customer identities in the transaction processor 120, associate bank accounts to the customer identities, and make payments between multiple accounts. The API system(s) 122 may communicate with the security system(s) 124, analytics system(s) 126, and the orchestration system(s) 128 to execute the electronic transactions of the present disclosure. For example, the API system(s) 122 may transmit the electronic fund transfer (or payment) requests to the orchestration system(s) 128. The orchestration system(s) 128 may then transmit the electronic payment requests to appropriate networks or schemes in the transaction network(s) 140 via the connection system(s) 130. (Further described later in detail below.) Additionally, the reconciliation system(s) 134 may receive notifications, messages, and/or acknowledgements from the transaction network(s) 140, and may transmit appropriate messages, alerts, and/or signals associated with the electronic fund transfer request to the requestor system(s) 110 in real-time.

The transaction processor 120 may be a single processor utilizing a single API domestically and/or internationally across the globe. That is, the transaction processor 120 may facilitate account-to-account real-time electronic transactions (e.g., electronic payments, funds transfer, currency exchange, reimbursement, asset managements, etc.) by establishing a client centric platform that unifies, orchestrates, and executes electronic transactions domestically and/or internationally. Moreover, the transaction processor 120 may be configured to execute electronic fund transfers, currency exchange transactions, tokenization, and/or electronic transaction authorizations within the single platform. Further, the transaction processor 120 may be configured to operate consistently, in accordance with globally accepted security and privacy practices. Furthermore, the transaction processor 120 may be configured to perform intelligent payment routing via the orchestration system(s) 128 in real-time based on user (e.g., the requestor system(s) 110) preferences. In some embodiments, the user may make changes to transaction routing preferences (e.g., time and costs of completing payment transactions) in real-time. The transaction processor 120 of the present disclosure may provide, among other things, a single partner accountability, cost reduction, improved cash flow, increased payment security, improved access to payments, and better insight and accountability of payments/funds. Thus, the transaction processor 120 may be a one-stop shop for executing payments transactions.

Still referring to FIG. 1, the transaction network(s) 140 may include one or more networks or schemes 142a, 142b-142n. The one or more schemes (or networks) 142a-142n may include, for example, an Automated Clearing House (ACH) networks (e.g., ACH, Same Day ACH, etc.), Card networks (e.g., American Express, Discover, MasterCard, Visa, etc.), Real Time Payment (RTP) networks (e.g., the Clearing House, etc.), blockchain networks, wire transfer networks, Faster Payments network, Bankers' Automated Clearing System (Bacs) Payment Schemes, the Clearing House Automated Payment System (CHAPS) network, Single Euro Payments Area (SEPA) network, SEPA Instant Credit Transfer (SCT Inst) network, and/or other financial platform networks (e.g., Dwolla, PayPal, Western Union, Currencycloud, TransferMate, etc.). The transaction network(s) 140 may complete or reject the electronic fund transfer request upon authenticating and/or authorizing the electronic fund transfer request in accordance with the established policies and/or rules of one or more of the schemes 142a, 142b-142n.

Figure 2:
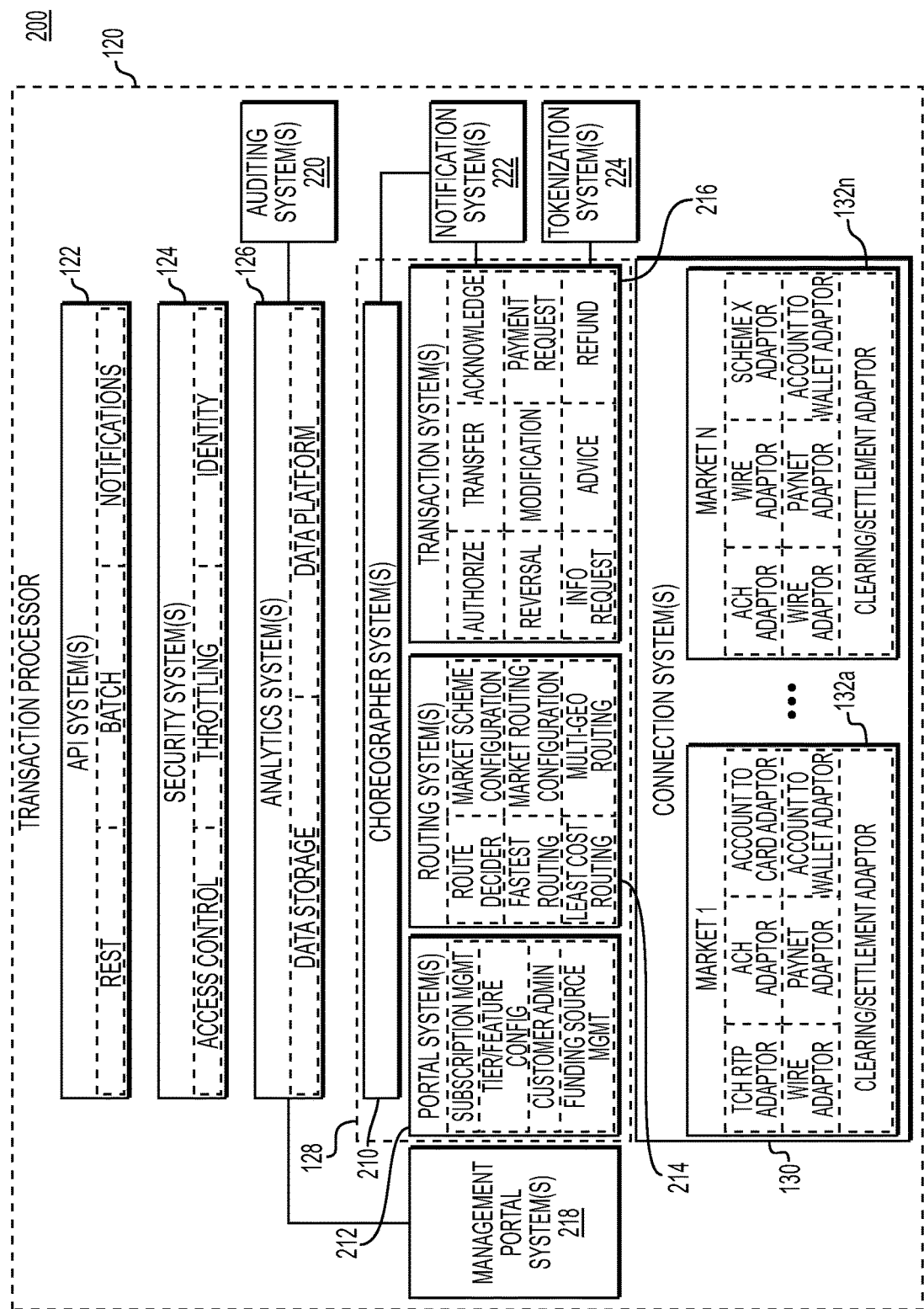
FIG. 2 depicts a block diagram of another exemplary electronic transaction system, according to one aspect of the present disclosure.

FIG. 2 depicts an exemplary system 200 including the transaction processor 120. Specifically, the portion depicted in FIG. 2 represents a more detailed example illustration of the transaction processor 120, but which should not be construed as limiting transaction processor 120. The transaction processor 120 may include one or more of the API system(s) 122, the security system(s) 124, the analytics system(s) 126, the orchestrating system(s) 128, a management portal system(s) 218, an auditing system(s) 220, a notification system(s) 222, and a tokenization system(s) 224. The API system(s) 122 may facilitate communications with the requestor system(s) 110, transaction network(s) 140, and between one or more systems (or microservices) of the transaction processor 120 depicted in FIG. 2. For example, the API system(s) 122 may utilize APIs (e.g., internal or external APIs), batch APIs, and/or notification APIs in order to facilitate the execution of the electronic transactions of the present disclosure. In one embodiment, the RESTful API of the API system(s) 122 may be accessed over one or more public Hypertext Transfer Protocol Secure (HTTPS) endpoints. The API system(s) 122 may utilize, for example, POST, GET, and PUT methods to execute and facilitate the electronic transactions of the present disclosure. In another embodiment, the batch API of the API system(s) may be accessed over one or more public Secure File Transfer Protocol (SFTP) endpoints.

Still referring to FIG. 2, the security system(s) 124 may facilitate, for example, user (or customer) access control, user throttling, and/or user identification. In one embodiment, the security system(s) 124 may ensure that the transaction processor 120 is in compliance with one or more data protection standards. One or more data elements of the transaction processor 120 may be monitored in order to meet the one or more encryption standards established by the transaction processor 120. For example, data elements, such as, personally identifiable information (PII), payment card data (PCI data), authentication credentials, other sensitive data, company confidential data, etc. may be monitored by the security system(s) 124.

In one embodiment, the security system(s) 124 may facilitate and manage the encryption of data and/or keys associated with the electronic transactions of the present disclosure. For example, the security system(s) 124 may include a key management service (KMS) that may establish a time-limit for the life of an encryption key. The KMS may be managed internally or externally (e.g., Amazon Web Service Key Management Service (AWS KMS)) from the transaction processor 120. In one embodiment, once an encryption key exceeds its lifespan, the encryption key may be deleted from an encryption key cache in the transaction processor 120. The encryption key may then be replaced with a newly generated key by the KMS. This functionality may provide compliance with a data key rotation policy that may be established by the transaction processor 120, for example, by setting a cache expiration that is within the data key rotation policy limits. Further, access to the keys in the KMS may be limited by the access control of the security system(s) 124 and may be assigned with least-privilege.

In one embodiment, the security system(s) 124 may be configured to give access to users to call operations against KMS Customer Master Key (CMK) with only the designated service and/or user identities. The security system(s) 124 may also audit the use and access of the master keys. Further, the security system(s) 124 may utilize a secure hash function (e.g., Secure Hash Algorithm-256 (SHA-256)) for data elements that are encrypted but also must be searched on. Since there may be cases where the hashed data elements (e.g., Sender name, Sender account number, Sender routing number, Receiver Name, Receiver account number, Receiver routing number, etc.) may be searched across all tenants, hashed data elements may have a global salt. In one embodiment, sensitive data elements that are at rest may be stored in the transaction processor 120 using Advanced Encryption Standard (AES)-256. Also, any message data in motion may be protected by enforcing a minimum of Transport Layer Security (TLS) 1.2.

Still referring to FIG. 2, the analytics system(s) 126 may comprise a data storage (e.g., a data lake) and a data platform for performing analytics. For example, the auditing system(s) 220 and the management portal system(s) 218 may be in communication with the analytics system(s) 126 in order to perform analysis and auditing on the electronic transactions of the present disclosure. The auditing system(s) 220 may subscribe to transaction event topics and transmit the event topics to a data lake for analytics. The management portal system(s) 218 may facilitate onboarding, configuration, and certification for the users of the transaction processor 120. The management portal system(s) 218 may provide self-service functionality for the users of the transaction processor 120 as well as administrative functionality for the internal support teams of the transaction processor 120.

Still referring to FIG. 2, the orchestration system 128 may include a choreographer system(s) 210, a portal system(s) 212, a routing system(s) 214, and transaction system(s) 216. The choreographer system(s) 210 may be configured to choreograph the steps required to process one or more real-time electronic transaction requests or one or more real-time transaction inquiries of the present disclosure. For example, the choreographer system(s) 210 may be configured to verify whether a transaction requestor (e.g., requestor system(s) 110) has permission to request transactions and/or inquiries. For example, the choreographer system(s) 210 may make an internal API call to an authorization system of the transaction processor 120.

In one embodiment, the choreographer system(s) 210 may facilitate execution of electronic funds transfer requests (or payment requests). For example, the choreographer system(s) 210 may make an internal API call to an account validation query system of the transaction processor 120 to validate whether the source account exists. The account validation query system may verify the formatting of the source and destination account. Further, the choreographer system(s) 210 may be configured to make internal API calls to an authorization system of the transaction processor 120 to verify that the user has permissions to perform payment using the specified source account. In one embodiment, the choreographer system(s) 210 may be configured to post a payment request to event-topic stream (e.g., Kafka) transactions. The choreographer system(s) 210 may be configured to respond back to an external API caller that the payment request has been accepted for processing.

In one embodiment, the choreographer system(s) 210 may be configured to process transaction inquiries in real-time. For example, the choreographer system(s) 210 may make internal API calls to the transaction query system to perform transaction lookups. Further, the choreographer system(s) 210 may make internal API calls to the authorization system to verify whether the user has permissions to view the transaction and associated accounts. Additionally, the choreographer system(s) 210 may respond back to an external API call through the API system(s) 122 with the inquiry response.

Still referring to FIG. 2, the portal system(s) 212 may be configured to facilitate, for example, subscription management of users (or customers) or developers, tier and feature configurations, customer administration, funding source managements, etc. The portal system(s) 212 may allow the developers or users of the requestor system(s) 110 to initiate transactions or payment requests, transmit transaction status, receive notifications, etc. in real-time. The portal system(s) 212 may be configured to facilitate or provide an integration portal that may include, for example, a unified developer portal (e.g., sandbox interface) that the developers may utilize in order to integrate the requestor system(s) 110 with the transaction processor 120. The integration portal may enable the developers to configure the request system(s) 110 to access, communicate with, and utilize the functionalities of the transaction processor 120. In some embodiments, the integration portal may include an interactive marketing platform of the transaction processor 120. The marketing platform may provide, for example, demonstration sections of how payments happen and what happens in the backend of the transaction processor, as well as various use cases for accessing, communicating with, and utilizing the functionalities of the transaction processor 120. Thus, the integration portal may achieve seamless integration of the requestor system(s) 110 with the transaction processor 120 via the marketing portal and the integration portal.

In one embodiment, the integration portal may include live connections to the APIs of the transaction processor 120, code snippets for communicating with the transaction processor 120, and a certification interface for certifying the APIs used for communicating with the transaction processor 120. The code snippets may be provided in different languages and in real-time. For example, changing the RTP scheme to a different scheme may be achieved by editing the snippets in a live sandbox environment. Further, the integration portal may provide Uniform Resource Locator (URL) links to the developers to allow using a common API by following the provided links and integrating with the transaction processor 120 easily and intuitively without having to store any separate URLs. Furthermore, the transactions may be updated in real-time via the integration portal. For example, payment rails may be changed based on the due date, the ability to cancel payments, etc. Additionally, the integration portal may provide notifications regarding the transaction that the users can access and see without having to email or call.

Still referring to FIG. 2, the routing system(s) 214 may facilitate route deciding, fastest routing, least cost routing, market scheme configuration, market routing configuration, multi-geo routing, etc. The routing system(s) 214 may execute transaction routing by looking at both customer configuration and scheme capabilities. The data associated with price, speed, and capability across both the customer and schemes may be utilized to identify the best possible route for the electronic transactions depending upon configuration for a specific customer and whether the customer has a speed versus cost processing preference. The routing system(s) 214 may utilize an open-source business rule management system (BRMS) (e.g., Drools) to implement the routing decision models. The routing system(s) 214 may be configured to facilitate and choreograph the steps required to route and execute payment requests. The routing system(s) 214 may subscribe to transaction event topics and may act on payment initiated events to initiate routing requests. In one embodiment, the routing system(s) 214 may make internal API calls to an entitlement query system(s) to retrieve customer specific configuration details that may impact the route of the payment requests. The routing system(s) 214 may process transaction requests, including customer entitlement details, through a routing model to identify the appropriate payment scheme adapter (further described in more detail below). The routing system(s) 214 may make internal API calls to one or more payment scheme adapters, which then may call the market specific payment scheme implementation. Further, the routing system(s) 214 may publish route chosen events to a transaction event topic data steam.

Still referring to FIG. 2, the transaction system(s) 216 may be configured to facilitate, for example, electronic funds transfer requests, electronic funds transfer information request, electronic funds transfer advice, electronic funds transfer authorization, acknowledgement, reversal, modification, and refund, etc. The transaction system(s) 216 may be in communication with the notification or messaging system(s) 222. The notification system(s) 222 may receive notifications from the payment schemes (e.g., schemes 142a-142n) to provide status updates as a transaction moves thorough its lifecycle. The notifications from the payment schemes, along with the associated scheme details, may be received through the API system(s) 122. The notification system(s) 222 may respond to the notifications with acknowledgments. The notification system(s) 222 may then publish a payment notification received event to a payment notification topic. In one embodiment, the notification system(s) 222 may include a payment notification handler that subscribes to payment notification topics and await the payment notification received messages. That is, when an event is processed, the payment notification handler may first make an internal API call to a transaction query system(s) to retrieve additional details of the transaction associated with the payment notification. The payment notification handler may then publish to a payment notification topic, a payment acknowledgement message.

The connection system(s) 130 may include one or more adapters for communicating with the transaction network(s) 140. For example, the connection adapters for Market 1 132a may include a TCH RTP adapter, ACH adapter, account to card adapter, wire adapter, payment adapter, account to wallet adapter, clearing/settlement adapter, etc. Additionally or alternatively, the connection adapters for Market N 132n may similarly include, for example, ACH adapter, wire adapter, scheme adapter, wire adapter, paynet adapter, account to wallet adapter, clearing/settlement adapter, etc.

In one embodiment, the transaction system(s) 216 may receive information associated with the electronic transactions of the present disclosure and facilitate the execution of the electronic transactions. The transaction system(s) 216 may transmit the transaction information to the tokenization system(s) 224. The tokenization system(s) 224 may then generate tokens to use surrogate values for the sensitive account details used for payment transactions requested by the requestor system(s) 110. A token may be a low-value token or a high-value token. Further, a token may be a randomly generated number. In other embodiments, a token may be a pseudorandom number, encrypted information, or other character sequence.

The transaction processor 120 may be deployed to servers and data centers in multiple regions and availability zones. The transaction processor 120 may be cloud-native and cloud-agnostic utilizing containerized microservices and may be deployed to an elastic infrastructure on an open-source container-orchestration system (e.g., Kubernetes). In one embodiment, the transaction processor 120 may be deployed and built completely in cloud. Thus, the complexity of the transaction processor 120 may be contained by building ground-up with cloud-based microservices design (e.g., AWS Cloud infrastructure). The cloud-based microservices design of the present disclosure may allow quick enhancements and elastically scaling the transaction processor 120 without customer impact or downtime. For example, small teams of developers may quickly add enhancements and new scheme supports. Also, failures may be contained and may prevent collateral damage to other functionality.

Figure 3:
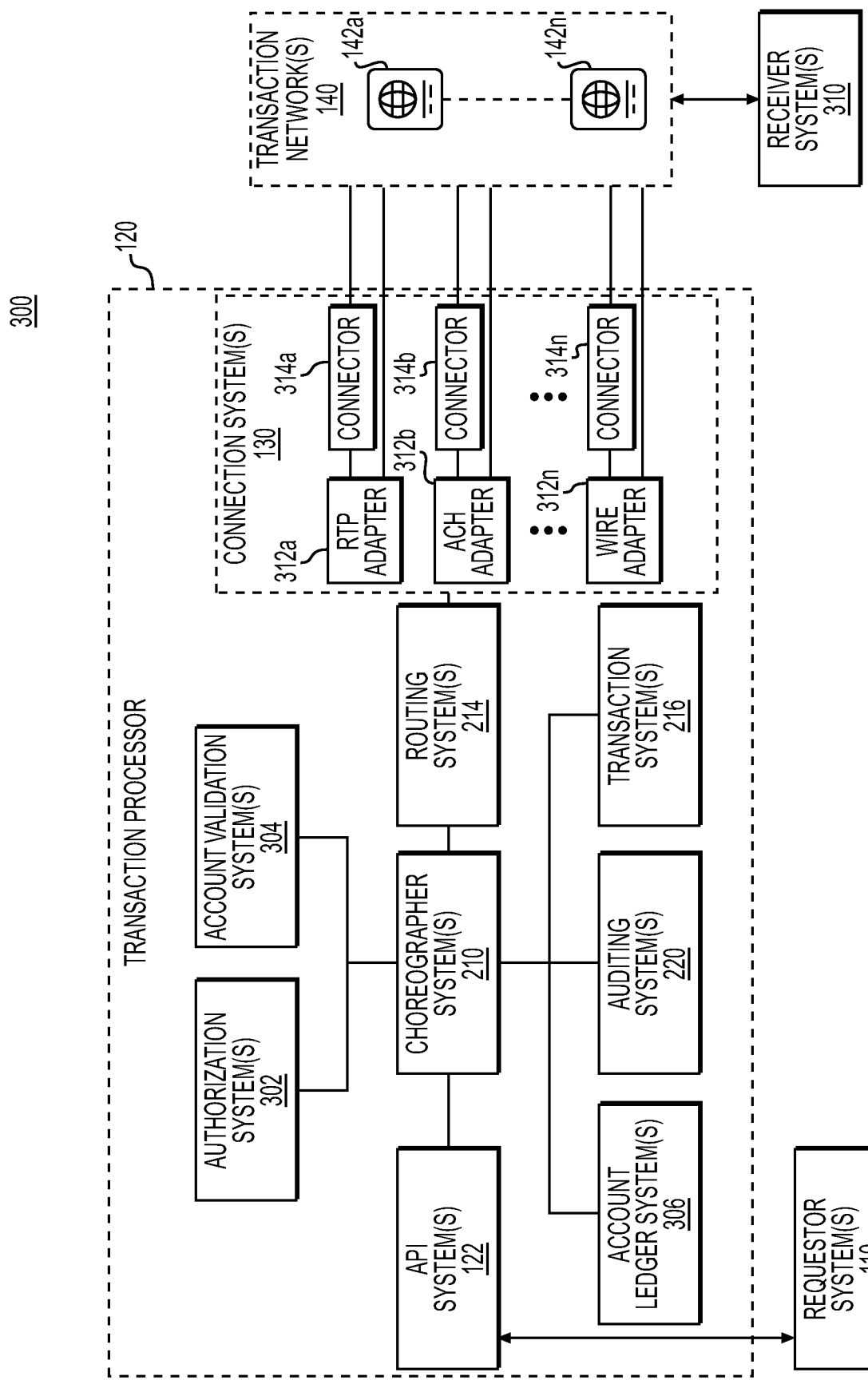
FIG. 3 depicts a block diagram of another exemplary electronic transaction system, according to one aspect of the present disclosure.

FIG. 3 depicts an exemplary system 300 for facilitating an electronic transaction request (e.g., a payment request) of the present disclosure. The system 300 may include, for example, the requestor system(s) 110, the transaction processor 120, the transaction network(s) 140, and the receiver system(s) 310. In this embodiment, the transaction processor 120 may include, further to the systems depicted in FIG. 3, one or more systems or microservices. For example, the transaction processor 120 may include an authorization system(s) 302, an account validation system(s) 304, an account ledger system(s) 306, and an auditing system(s) 220, which may be in in communication with the choreographer system(s) 210. In this embodiment, the connection system(s) 130 may include one or more scheme or network adapters. For example, the connections system(s) 130 may include an RTP adapter 312a, an ACH adapter 312b, a wire adapter 312n, etc. Further, the connection system(s) 130 may include connectors 314a-n that may be configured to facilitate communication with the transaction network(s) 140.

Still referring to FIG. 3, the authorization system(s) 302 may expose an internal API that may be called by other systems or microservices within the transaction processor 120 to verify that a user has access to perform operations and view data. The account validation system(s) 304 may exposes an internal API that may be called by other systems or microservices within the transaction processor 120 to perform inquiries against account details stored in a transaction processor database (not shown in the figure). The account ledger system(s) 306 may expose an internal API that may be called by other systems or microservices within the transaction processor 120 to perform inquiries against account ledger details stored in the database of the transaction processor 120. The account ledger system(s) 306 may subscribe to the transaction event topics of Kafka streams transmitted by the choreographer system(s) 210 in accordance with the present disclosure. Further, the account ledger system(s) 306 may watch for complete states and may use these events to update the ledger database. In one embodiment, the auditing system(s) 220 may subscribe to the transaction event topics of Kafka streams transmitted by the choreographer system(s) 210. The auditing system(s) 220 may transmit these events to a data lake for analytics.

Still referring to FIG. 3, the transaction system(s) 216 may expose an internal API that may be called by other systems or microservices within the transaction processor 120 to perform inquiries against account details stored in a Not Only Structured Query Language (NoSQL) database provided by the transaction processor 120. As described in reference to FIG. 2, the routing system(s) 214 may be responsible for choreographing the steps required to route and execute payment requests. The routing system(s) 214 may subscribe to the transaction event topics of Kafka streams transmitted by the choreographer system(s) 210 and may act on payment initiated events to initiate routing requests. The routing system(s) 214 may make an internal API call to the Entitlement Query Service to retrieve customer specific configuration details that may impact the route. The routing system(s) 214 may process the request, including the customer entitlement details, through the routing model to identify the appropriate payment scheme adapter.

Still referring to FIG. 3, the RTP adapter 312a may expose an internal API for processing payments across RTP schemes or rails. The RTP scheme adapter 312a may call into the internal/external market specific API RTP rail implementation. The ACH adapter may expose an internal API for processing payments across ACH rails. The ACH adapter 312b may call into the internal/external market specific API ACH rail implementation. The wire adapter 312n may expose an internal API for processing payments across wire rails. The wire adapter 312n may call into the internal/external market specific API wire rail implementation.

In one embodiment, incoming payment requests (e.g., a payment request API) from users (e.g., a payment sender) in the requestor system(s) 110 may be managed by the API system(s) 122. The API system(s) 122 may execute an authentication check of the user identify (e.g., via an Open Authorization 2.0 (OAuth2)) by communicating with an identity provider (IdP) of the transaction processor 120. The API system(s) 122 may then forward the payment request to the payment choreograph system(s) 210. The choreographer system(s) 210 may then initiate an authorization check with the authorization system(s) 302. Once authorization system(s) 302 verifies the requestor system(s) 110 has permission to perform the transaction, the choreographer system(s) 210 may communicate with the account validation system(s) 304 to check whether the user in requestor system(s) 110 exist in a database of the transaction processor 120. The choreographer system(s) 210 may then stream Kafka messages that may be received by the account ledger system(s) 306, auditing system(s) 220, transaction system(s) 216, and the routing system(s) 214.

Still referring to FIG. 3, the routing system(s) 214 may forward the payment request to the optimal scheme (or rail) adapter in the connection system(s) 130. The connection system(s) 130 may then transmit the payment request to the appropriate scheme (e.g., schemes 142a-142n) in the transaction network(s) 140. In one embodiment, a third-party service provider may directly implement one or more adapters provided by the connection system(s) 130. Thus, the transaction processor 120 may not be required to integrate to the third-party service provider API.

Figure 4:
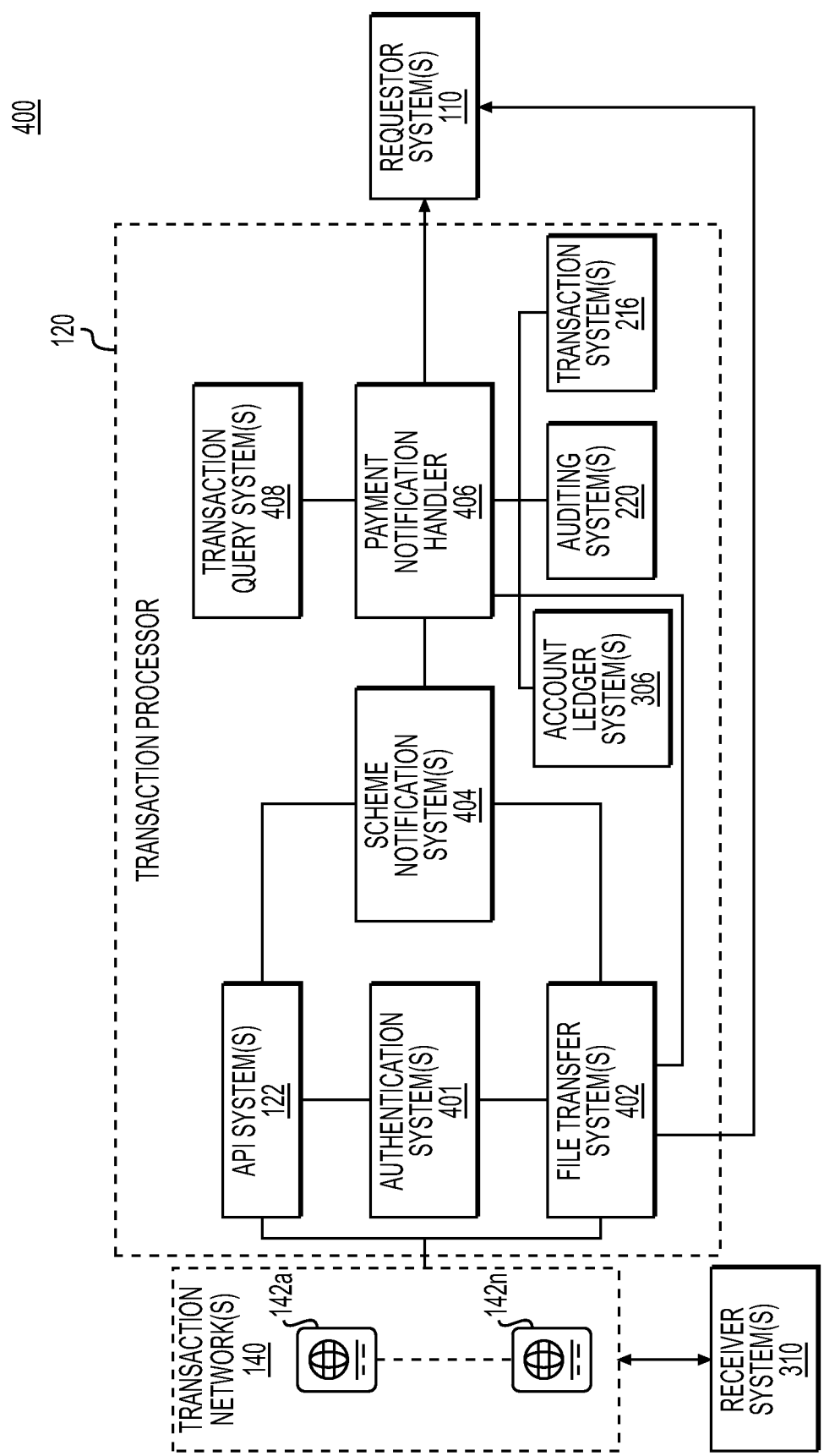
FIG. 4 depicts a block diagram of another exemplary electronic transaction system, according to one aspect of the present disclosure.

FIG. 4 depicts an exemplary system 400 for facilitating transaction reconciliation and notification of the present disclosure. The system 400 may include, for example, the requestor system(s) 110, the transaction processor 120, the transaction network(s) 140, and a receiver system(s) 310. In this embodiment, the transaction processor 120 may include, further to the systems depicted in FIGS. 3 and 4, an authentication system(s) 401, a file transfer system(s) 402, a scheme notification system(s) 404, a payment notification handler 406, and a transaction query system(s) 408. In one embodiment, the reconciliation system(s) 134 may include the scheme notification system(s) and the payment notification handler 406. Of course, other systems of the transaction processor 120 shown in FIG. 4 may be integrated into the reconciliation system(s) 134 to execute the reconciliation and notification process of the present disclosure. In one embodiment, the authentication system(s) 401 may authenticate APIs using an OAuth2 protocol against an identity provider (IdP) of the transaction processor 120. Further, the authentication system(s) 401 may authenticate username and password for accessing the portal system(s) 212. In one embodiment, the scheme notification system(s) 404 may translate scheme specific notifications into a generic non-scheme specific format. The file transfer system(s) 402 may aggregate the notifications received from the schemes 142a-142n into a file and send to the receiver system(s) 310 based on the configured preferences. The transaction query system(s) 408 may expose an internal API that may be called by other systems or microservices of the transaction processor 120 to perform inquiries against account details stored in the NoSQL database. Further, the transaction query system(s) 408 may subscribe to transaction event topics from the Kafka streams of the transaction processor 120 and may utilize these events to update the NoSQL database. In one embodiment, the payment notification handler 406 may subscribe to payment notification topics and await the payment notification received messages. That is, when an event is processed, the payment notification handler 406 may first make an internal API call to a transaction query system(s) 408 to retrieve additional details of the transaction associated with the payment notification. The payment notification handler 406 may then publish to a payment notification topic, a payment acknowledgement message.

In one embodiment, the schemes 142a-142n in the transaction network(s) 140 may provide transaction updates to the transaction processor 120 as a transaction is processed. The updates may be received by the API system(s) 122 or as batch files (Secure File Transfer Protocol (SFTP) push or pulls) handled by the file transfer system(s) 402. The updates may also be authenticated by the authentication system(s) 401 to validate the sender of the updates. Upon successful validation, the updates may then be routed to the scheme notification system(s) 404. The scheme notification system(s) 404 may translate the scheme specific notification into a generic non-scheme specific format. The generic message may be pushed onto the Kafka message que and may be received by the payment notification handler 406. The payment notification handler 406 may call the transaction query system(s) 408 to retrieve the transaction details from a database of the transaction processor 120. The payment notification handler 406 may then transmit a Kafka message to the account ledger system(s) 306, auditing system(s) 220, and the transaction system(s) 216, and/or the file transfer system(s) 402. The file transfer system(s) 402 may aggregate the notifications into a file. The notification file may then be sent to the receiver system(s) 310 based on the configured preferences (e.g., a Webhook to the configured HTTPs endpoint, an SFTP push to the configured SFTP endpoint, and/or an SFTP pull form the receiver system(s) 310 to an SFTP server of the transaction processor. Thus, the reconciliation and notification aspects of the present disclosure may provide a real-time status of the payment to the requestors system(s) 110, allowing the transaction requestors to always know where the payment stands.

Figure 5:
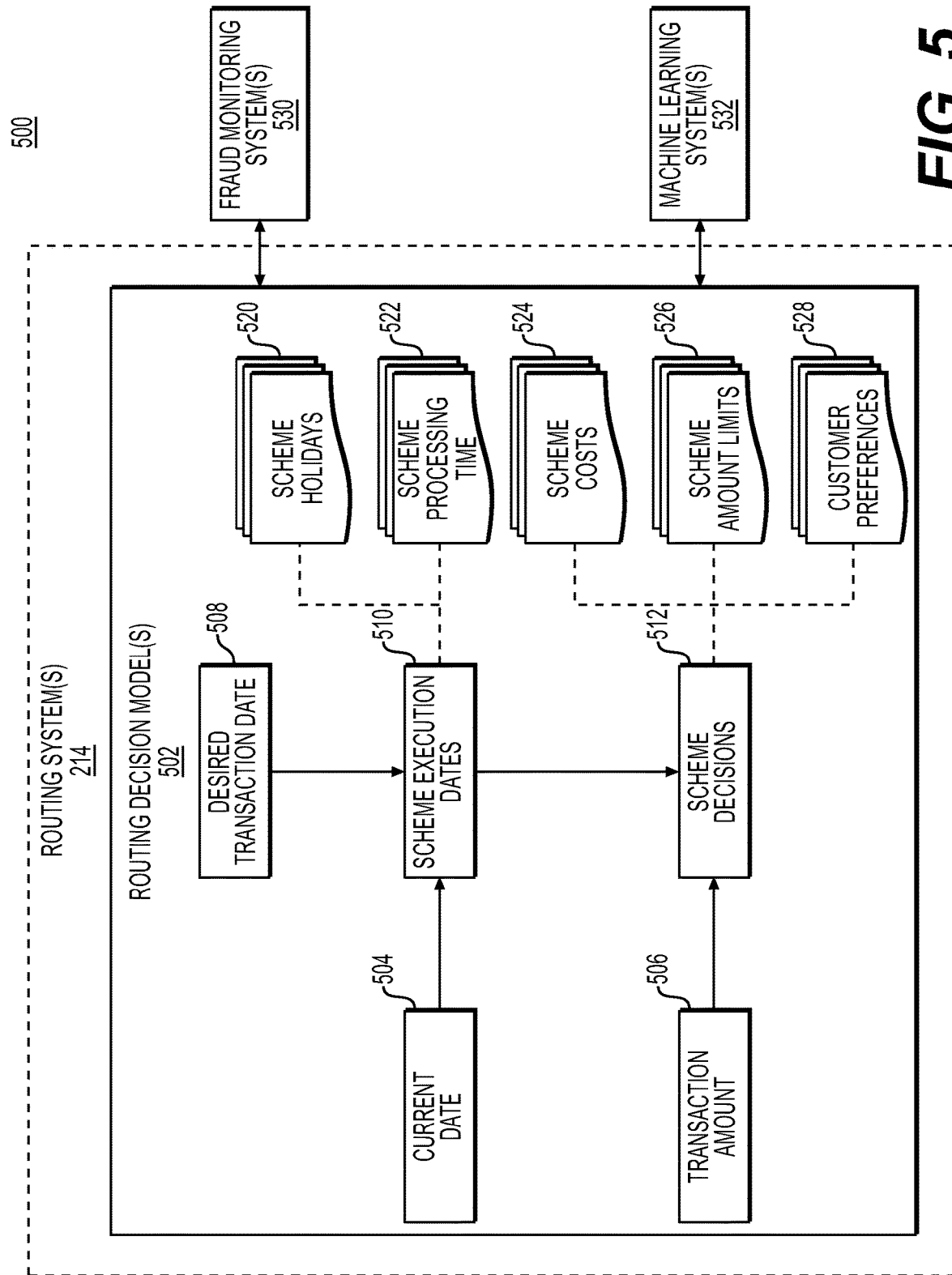
FIG. 5 depicts a block diagram of another exemplary electronic transaction system, according to one aspect of the present disclosure.

FIG. 5 depicts an exemplary system 500 for facilitating a transaction routing of the present disclosure. The system 500 may include, the routing system(s) 214, a fraud monitoring system(s) 530, and a machine learning system(s) 532. In this embodiment, the routing system(s) 214 may include a routing decision model(s) 502. In one embodiment, the routing system(s) 214 may perform transaction routing by looking at both customer configurations and scheme capabilities. That is, the routing system(s) 214 may consider price, speed, and capability facts across both the customers and the schemes (e.g., schemes 142a-142n) and may identify the best possible route for the transaction. The route for the transaction may be determined based on the configurations or preferences of a customer (e.g., speed versus cost processing preference). In one embodiment, the routing decision model(s) 502 may utilize at least the following data to determine an optimal path for executing the electronic transactions (e.g., payment request) of the present disclosure: current date 504, transaction amount 506, desired transaction date 508, scheme execution dates 510, scheme decisions 512, scheme holidays 520, scheme processing time 522, scheme costs 524, scheme amount limits 526, and customer preferences 528. The optimal path for executing, for example, a payment request, may be based on the user's (or client's) desired preferences. In one embodiment, the routing decision model(s) 502 may consider, for example, two key inputs: transaction amount 506 and desired transaction date 508. That is, the routing decision model(s) 502 may factor in customer preferences and business knowledge to make decisions on the transaction schemes 142a-142n and scheme execution dates 510.

In one embodiment, one or more routing criteria may be considered by the routing decision model(s) 502 to determine the optimal transaction routes. For example, with respect to geography, the following questions, for example, may be considered: 1) Is this a U.S. domestic transaction? 2) Is this a U.K. domestic transaction? 3) Is this cross-border? and so on. Each option may affect or change the available routes and influence the decisioning processes of the routing decision model(s) 502. Regarding the scheme holidays 520 and the scheme processing time 522, unlike the RTP scheme, for example, other schemes or rails may take days to process a transaction. In order ensure that a transaction gets processed on time, the processing time must be calculated and trace back to ensure any non-processing windows like a weekend or a bank holiday are not ignored. Regarding the scheme (or rail) costs 524, the costs may vary from rail to rail. As such, depending on the customer preference, the transactions may be routed through the cheapest rout. Regarding the scheme amount limits 526, a transaction may exceed a particular rail's maximum allowed threshold. In such a case, the routing decision model(s) 502 may not consider that particular route option or potentially split a transaction across multiple payment rails. The rules built by the routing decision model(s) 502 may be configurable, for example, at different hierarchies: global system-wide rules; rules particular to a payment scheme; and customized client specific rules. Beyond the rules-based routing inputs, the routing system(s) 214 may take real-time feedback from the fraud monitoring system(s) 530. That is, based on a fraud profiling conducted by the fraud monitoring system(s) 530, a transaction may be to a different rail. For example, a risky transaction may be moved from an RTP scheme to a credit scheme if the credit scheme may allow for charge-backs. Also, inputs from the machine learning system(s) 532 (e.g., Ethos) may provide out-of-band, non-real-time machine learning feedback to adjust payment routes as subtle trends are identified.

Figure 6:
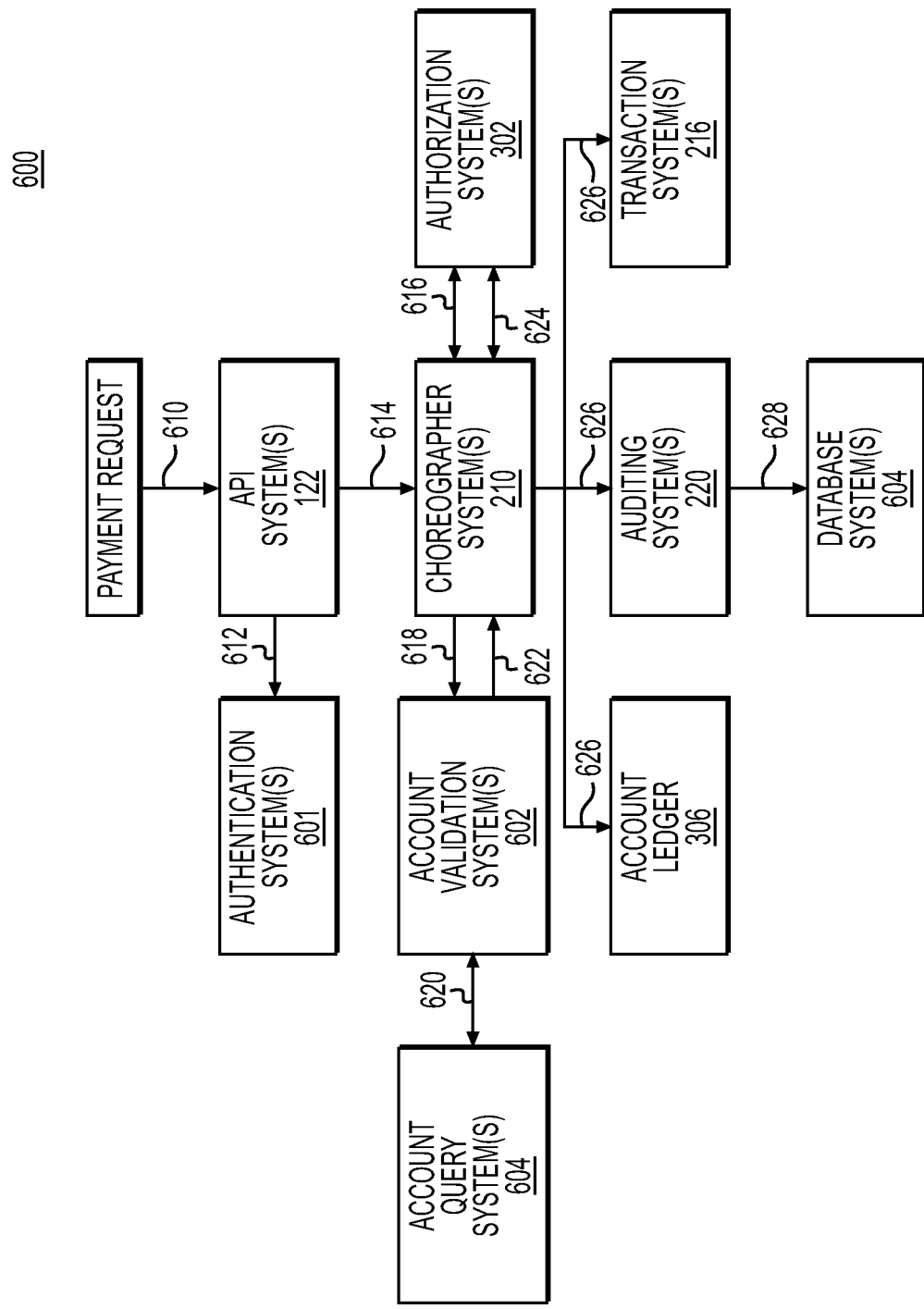
FIG. 6 illustrates a flowchart of an exemplary method of executing an electronic transaction, according to one aspect of the present disclosure.

FIG. 6 illustrates a flowchart of an exemplary method 600 of executing an electronic transaction of the present disclosure. Exemplary process flows of the method 600, performed in accordance with the systems 100, 200, and 300 above, are described hereinafter.

At step 610, the API system(s) 122 may receive a payment request from a user (e.g., requestor system(s) 110). At step 612, the API system(s) 122 may communicate with the authentication system(s) 302 to authenticate the user. The authentication system(s) 302 may communicate with an identity provider (IdP) of the transaction processor 120 to verify the authenticity of the identity of the user. At step 614, the API system(s) 122 may transmit the payment request to the choreographer system(s) 210. At step 616, the choreographer system(s) 210 may make an internal API call to an authorization system(s) 601 of the transaction processor. The authorization system(s) 601 may verify whether the user has permissions to perform a payment request. The authorization system(s) 601 may then transmit an authorization response to the choreographer system(s) 210. At step 618, the choreographer system(s) 210 may make an internal API call to an account validation system(s) 602 to verify whether the referenced bank accounts associated with the payment request exists in the transaction processor 120. At step 620, the account validation system(s) 602 may communicate with an account query system(s) 604 of the transaction processor 120 to confirm whether the bank accounts associated with the payment request exists outside of the transaction processor 120. At step 622, the account validation system(s) 602 may transmit a validation response message to the choreographer system(s) 210. At step 624, the choreographer system(s) 210 may make an internal API call to the authorization system(s) 601 to verify that the user has permission to transact against the sender account. The authorization system(s) 601 may then transmit an authorization response to the choreographer system(s) 210. At step 626, the choreographer system(s) 210 may publish, via an event-topic stream (e.g., Kafka stream) a payment request message to the account ledger system(s) 306, the auditing system(s) 220, and the transaction system(s) 216. The choreographer system(s) 210 may also respond back to the user that the payment request has been accepted for processing. Further, the payment request message may be sent to its subscribers for processing. For example, the routing system(s) 214 may receive the payment request event and may begin processing the payment. The transaction query system may receive the payment request event and update its NoSQL database. The account ledger system(s) 306 may receive the payment request event and may ignore it since they payment has not yet been completed. At step 628, the auditing system(s) 220 may transmit the payment request event to the database system(s) 604 for analytics.

Figure 7:
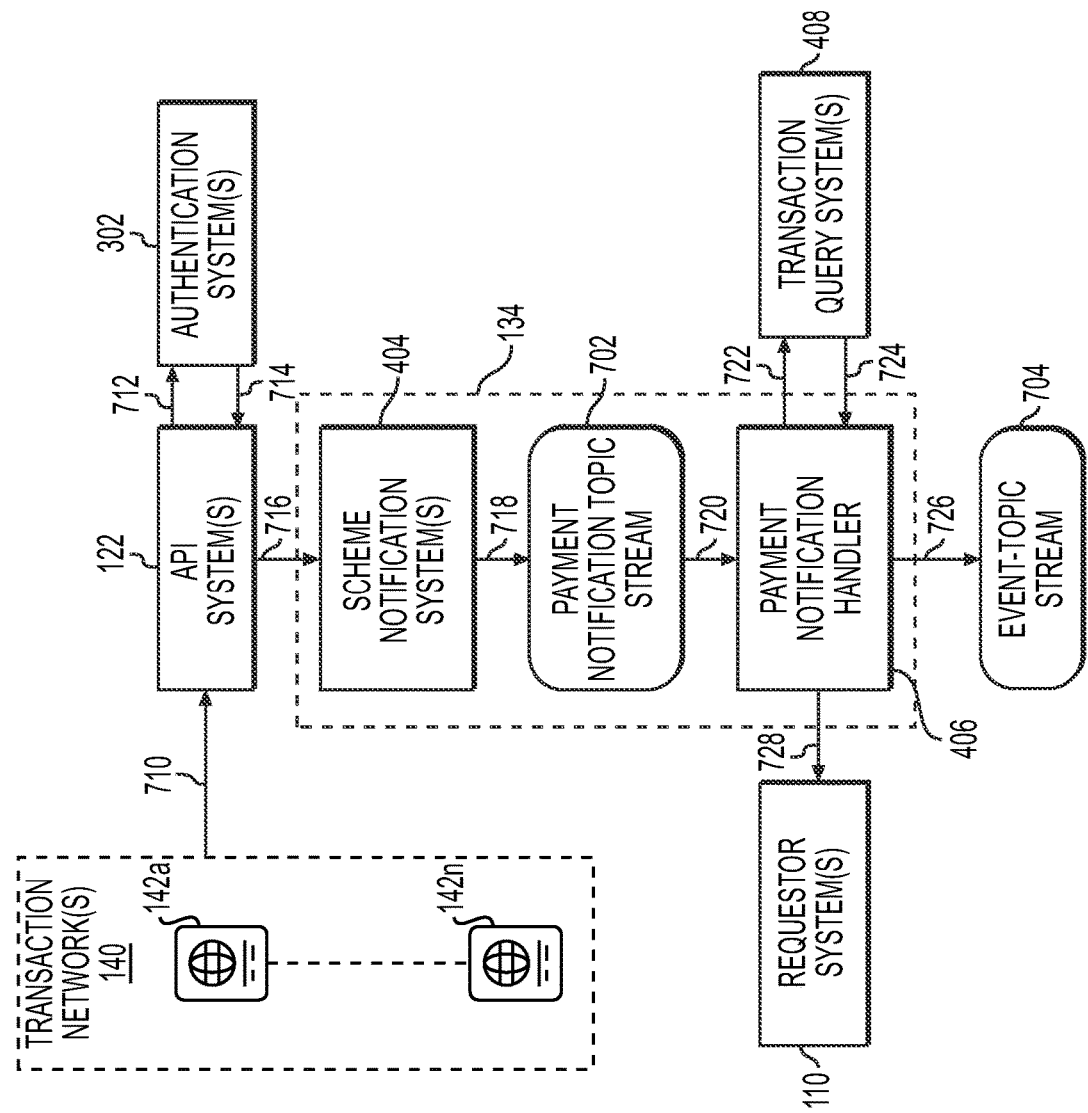
FIG. 7 illustrates a flowchart of another exemplary method of executing an electronic transaction, according to one aspect of the present disclosure.

FIG. 7 illustrates a flowchart of an exemplary method 700 of executing real-time reconciliation and notification of an electronic transaction in accordance with the present disclosure. Example process flows of the method 700, performed in accordance with the systems 100, 200, 300, 400, and 500 above, are described hereinafter.

At step 710, the API system(s) 122 may receive, from the transaction network(s) 140, a transaction notification (or update) message associated with the payment request made by the user in accordance with the process 600 of FIG. 6. The notification message may include one or more real-time statuses of the payment request(s) received by the transaction network(s) 140. For example, one of more transaction schemes of the transaction network(s) 140 may generate, in real-time, alerts, messages, notification, and/or signals when a new event (e.g., failed transaction, rejected transaction, pending transaction, settled transaction, etc.) associated with a payment request is detected or created by the one or more transaction schemes. In one embodiment, the notification message may include one or more scheme-specific formats. The notification message may be received by the file transfer system 402 via SFTP push/pull protocol messages. At step 712, the API system(s) 122 and/or the file transfer system 402 may request to authenticate the notification message received from the transaction network(s) 140 by utilizing, for example, an OAuth2 protocol or SFTP push/pull protocol messages.

Still referring to FIG. 7, at step 714, the authentication system(s) 302 may generate and transmit an authentication response to the API system(s) 122 and/or the file transfer system 402. The authentication response may be generated based on the information associated with the transaction request, the requestor system(s) 110 that transmitted the transaction request, the transaction request receiver, etc. At step 716, the API system(s) 122 and/or the file transfer system 402 may transmit one or more API calls including the authenticated notification message to one or more matching scheme notification system(s) 404 of the reconciliation system 134. In one embodiment, the scheme notification system(s) 404 may translate the scheme specific notification message into a non-scheme specific format that may be compatible for processing and communicating by the transaction processor 120. At step 718, the scheme notification system(s) 404 may transmit, for example, via a Kafka stream, a payment notification topic stream 702 to the payment notification handler 406. At step 722, the payment notification handler 406 may transmit a transaction detail request to the transaction query system(s) 408 to retrieve the transaction details (e.g., payment sender, receiver, transaction preference, etc.) associated with the payment request made by user of the requestor system(s) 110.

At step 724, the transaction query system(s) 408 may transmit the transaction details associated with the payment request of the user. At step 726, the payment notification handler 406 may generate a status message in accordance with the transaction details and the notification message received from the scheme notification system(s) 404. The payment notification handler 406 may then transmit the status message via an event-topic stream 704, for example, via a Kafka message, to one or more microservices (e.g., account ledger, auditing system(s) transaction store, etc.) of the transaction processor 120 for further processing. In one embodiment, the message transmitted via the event-topic stream 704 may be utilized by the transaction processor 120 to generate one or more user interfaces. For example, the transaction processor 120 may generate a transaction activity interface 802 shown in FIG. 8. The transaction activity interface 802 may include information associated with the statuses of the transactions requested by the requestor system(s) 110. In one embodiment, the users of the requestor system(s) 110 may access the transaction activity interface 802 to obtain real-time statuses of transaction requests made via the requestor system(s) 110. For example, a user of the requestor system(s) 110 may obtain information associated with transactions, rejected transactions, pending transactions, settled transactions, etc. In some embodiments, the user may request to alter or make changes to transaction request via the transaction activity interface 802.

Still referring to FIG. 7, at step 728, the payment notification handler 406 may transmit the notification message to the requestor system(s) 110 based on one or more configuration preferences of the requestors system(s) 110. For example, the notification message may be sent to the requestor system(s) 110 via: a webhook to a configured HTTPs endpoint; an SFTP push to a configured SFTP endpoint of the requestor system(s) 110, and/or an SFTP pull from one or more users (or clients) to an SFTP server of the transaction processor 120. Accordingly, one or more users or the requestors system(s) 110 may keep track of the request transactions. For example, the users or the requestor system(s) 110 may be notified of the status of a transaction (or payment request) in real-time. Accordingly, the notifications or updates generated and transmitted by the reconciliation system(s) 134 may provide real-time, up-to-date information regarding the transaction requests of the present disclosure. Additionally, the users or the requestor system(s) 110 may utilize the reconciliation system(s) 134 of the present disclosure to provide independent systems (e.g., an Enterprise Resource Planning (ERP) systems) to stay up-to-date in real-time on the statuses of the transaction requests of the present disclosure. Further, the users or the requestor system(s) 110 may register a (Uniform Resource Locator) URL to receive real-time notification on the statuses of the transaction requests.

Figure 9:
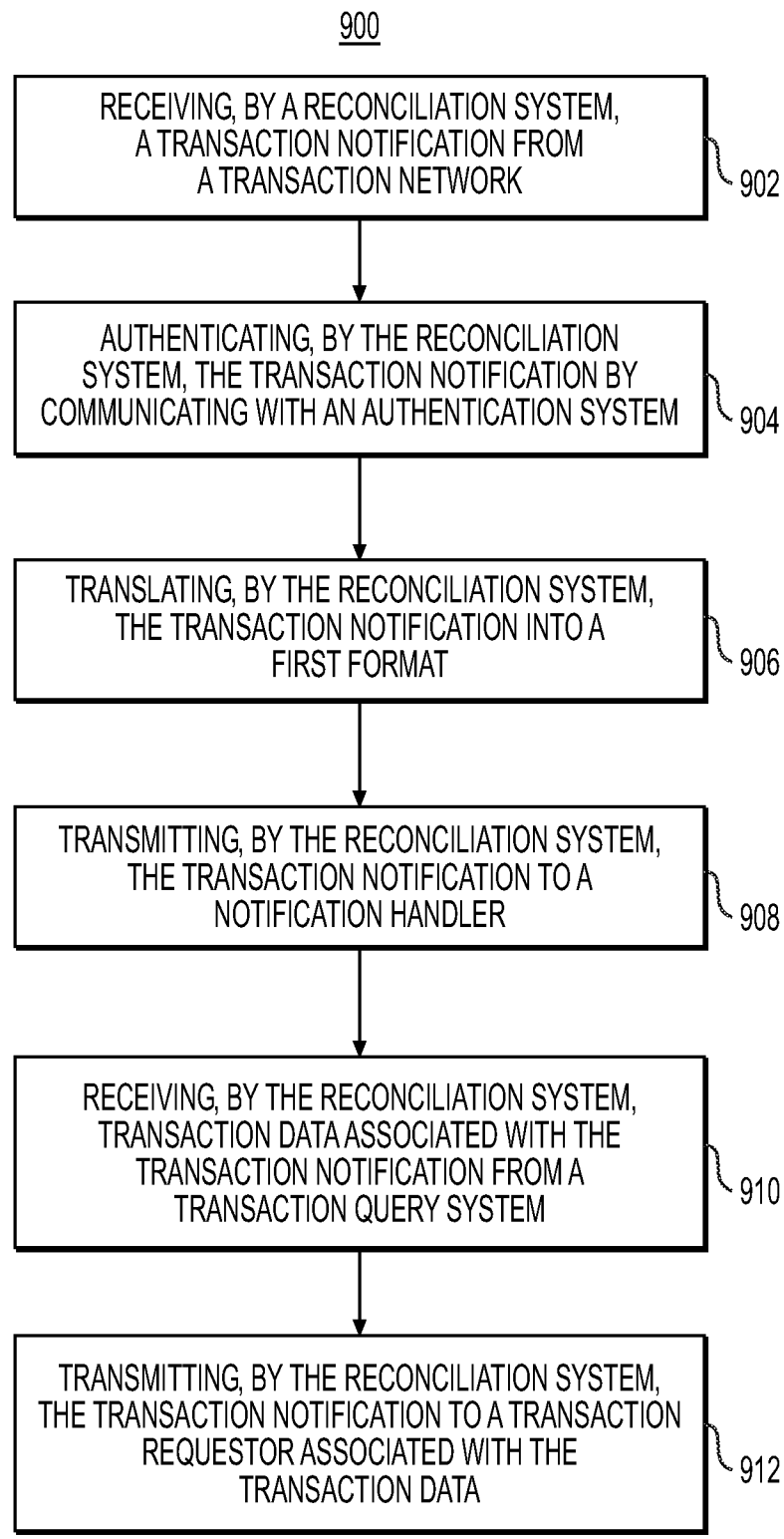
FIG. 9 illustrates a flowchart of yet another exemplary method of executing an electronic transaction, according to one aspect of the present disclosure.

FIG. 9 illustrates a flowchart of another exemplary method 900 for executing reconciliation and notification of an electronic transaction in accordance with the present disclosure. Example process flow of the method 900, performed in accordance with the systems 100, 200, 300, 400, and 500 above, are described hereinafter.

At step 902, a reconciliation system (e.g., reconciliation system(s) 134) may receive a transaction update (or a notification message) from a transaction network. In one embodiment, the transaction update associated with the transaction request may be received in real-time when the transaction network generates one or more updates associated with the transaction request. Further, the reconciliation system may receive the transaction update via an Application Programing Interface (API) call and/or a Secure File Transfer Protocol (SFTP) message. In one embodiment, the transaction update may be associated with one or more payment requests by a requestor system (e.g., requestor system(s) 110). At step 904, the reconciliation system may authenticate, the transaction update by communicating with an authentication system (e.g., authentication system(s) 302). In one embodiment, the reconciliation system may route the transaction update to a matching transaction network notification system (e.g., the scheme notification system(s) 404).

At step 906, the reconciliation system may translate the transaction update into at least another format. The at least another format may be a generic format that may be suitable for processing and transmitting by the transaction processor 120 in accordance with the present disclosure. In one embodiment, the reconciliation system may translate the transaction update into a format suitable for normalization. At step 908, the reconciliation system may transmit the transaction update to a notification handler (e.g., payment notification handler 406). At step 910, the reconciliation system may receive transaction data associated with the transaction update from a transaction query system (e.g., the transaction query system(s) 408). At step 912, the reconciliation system may transmit the transaction update to a transaction requestor (e.g., requestor system(s) 110) associated with the transaction data. In one embodiment, the transaction update may be transmitted to the transaction requestor via an Application Programing Interface (API) call and/or a Secure File Transfer Protocol (SFTP) message. In one embodiment, the reconciliation system may transmit the transaction update to an account ledger system (e.g., account ledger system(s) 306), an auditing system (e.g., auditing system(s) 220), and/or a transaction system (e.g., transaction system(s) 216) via one or more transaction event-topic streams. In one embodiment, the real-time transaction system may generate one or more interface including information associated with one or more statuses of the transaction request based on the transaction update.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 10:
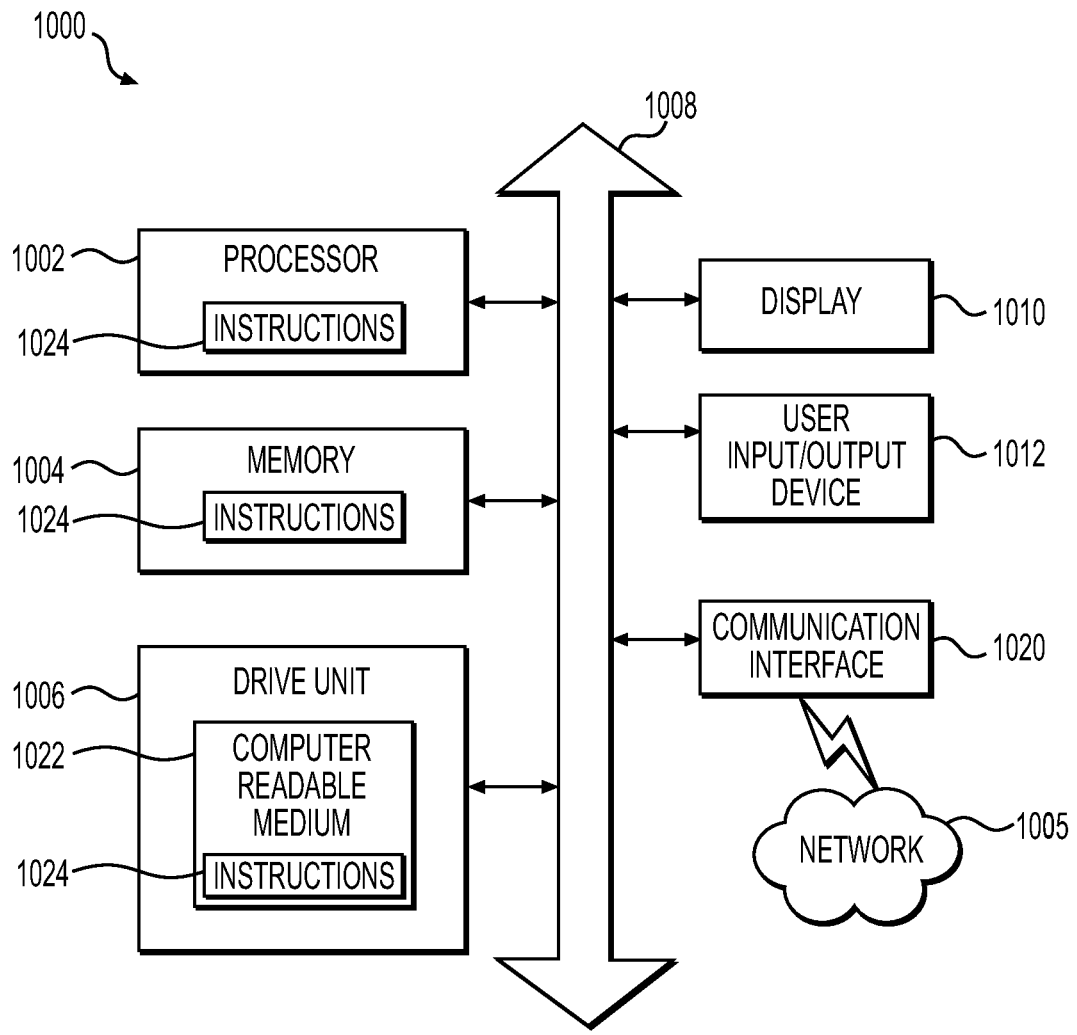
FIG. 10 illustrates a computer system for executing the techniques described herein.

FIG. 10 illustrates a computer system designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 900 can be implemented using electronic devices that provide voice, video, or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1004 includes a cache or random-access memory for the processor 1002. In alternative implementations, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described herein may be performed by the programmed processor 1002 executing the instructions stored in the memory 1004. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel payment and the like.

As shown, the computer system 1000 may further include a display unit 1010, such as a liquid crystal display (LCD), an organic light emitting diode (OLED), a flat panel display, a solid-state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1006.

Additionally or alternatively, the computer system 1000 may include an input device 1012 configured to allow a user to interact with any of the components of system 1000. The input device 1012 may be a number pad, a keyboard, or a cursor control device, such as a mouse, or a joystick, touch screen display, remote control, or any other device operative to interact with the computer system 1000.

The computer system 1000 may also or alternatively include a disk or optical drive unit 1006. The disk drive unit 1006 may include a computer-readable medium 1022 in which one or more sets of instructions 1024, e.g., software, can be embedded. Further, the instructions 1024 may embody one or more of the methods or logic as described herein. The instructions 1024 may reside completely or partially within the memory 1004 and/or within the processor 1002 during execution by the computer system 1000. The memory 1004 and the processor 1002 also may include computer-readable media as discussed above.

In some systems, a computer-readable medium 1022 includes instructions 1024 or receives and executes instructions 1024 responsive to a propagated signal so that a device connected to a network 1005 can communicate voice, video, audio, images, or any other data over the network 1005. Further, the instructions 1024 may be transmitted or received over the network 1005 via a communication port or interface 1020, and/or using a bus 1008. The communication port or interface 1020 may be a part of the processor 1002 or may be a separate component. The communication port 1020 may be created in software or may be a physical connection in hardware. The communication port 1020 may be configured to connect with a network 1005, external media, the display 1010, or any other components in system 1000, or combinations thereof. The connection with the network 1005 may be a physical connection, such as a wired Ethernet connection or may be established wirelessly as discussed below. Likewise, the additional connections with other components of the system 1000 may be physical connections or may be established wirelessly. The network 1005 may alternatively be directly connected to the bus 1008.

While the computer-readable medium 1022 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1022 may be non-transitory, and may be tangible.

The computer-readable medium 1022 can include a solid-state memory such as a memory card or other package that houses one or more non-volatile read-only memories. The computer-readable medium 1022 can be a random-access memory or other volatile re-writable memory. Additionally or alternatively, the computer-readable medium 1022 can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1000 may be connected to one or more networks 1005. The network 1005 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1005 may include wide area networks (WAN), such as the Internet, local area networks (LAN), campus area networks, metropolitan area networks, a direct connection such as through a Universal Serial Bus (USB) port, or any other networks that may allow for data communication. The network 1005 may be configured to couple one computing device to another computing device to enable communication of data between the devices. The network 1005 may generally be enabled to employ any form of machine-readable media for communicating information from one device to another. The network 1005 may include communication methods by which information may travel between computing devices. The network 1005 may be divided into sub-networks. The sub-networks may allow access to all of the other components connected thereto or the sub-networks may restrict access between the components. The network 1005 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method of generating a transaction activity interface by a real-time transaction system, the method comprising:
    receiving, at an API system associated with the real-time transaction system, a transaction notification message associated with a payment request made by a user;
    requesting, by the API system and via utilization of a predetermined protocol, authentication of the transaction notification message from an authentication system associated with the real-time transaction system;
    receiving, at the API system from the authentication system, an authentication response;
    transmitting, using the API system and including the authentication response, one or more API calls to one or more matching scheme notification systems of a reconciliation system associated with the real-time transaction system;
    transmitting, using the reconciliation system, a payment notification topic stream to a payment notification handler associated with the real-time transaction system;
    retrieving, from a transaction query system and using the payment notification handler, transaction details associated with the payment request;
    transmitting, based on the transaction details and via an event-topic stream, a generated status message to one or more microservices of a transaction processor; and
    generating, based on the generated status message, a transaction activity user interface.

2. The method of claim 1, wherein the transaction notification message comprises an indication of one of: a failed transaction, a rejected transaction, a pending transaction, and settled transaction.

3. The method of claim 1, wherein the predetermined protocol is one of: an OAuth2 protocol or an SFTP push/pull protocol.

4. The method of claim 1, wherein the transmitting the payment notification topic stream comprises transmitting the payment notification topic stream via a Kafka stream.

5. The method of claim 1, wherein the transaction activity user interface comprises information associated with statuses of transactions and wherein the information is contained within one of: a failed transaction table, a rejected transaction table, a pending transaction table.

6. The method of claim 1, further comprising:
    receiving, from the user and at the transaction activity interface, a status request from the user; and
    obtaining, based on the received status request, one or more real-time statuses of one or more transaction requests.

7. The method of claim 6, further comprising:
    receiving, from the user and at the transaction activity user interface, a modification request to alter the transaction request; and
    implementing, based on the modification request, an alteration to the transaction request.

8. A real-time transaction system comprising:
    one or more computer readable media storing instructions for executing a real-time electronic transaction; and
    one or more processors configured to execute the instructions to perform operations comprising:
        receiving, at an API system associated with the real-time transaction system, a transaction notification message associated with a payment request made by a user;
        requesting, by the API system and via utilization of a predetermined protocol, authentication of the transaction notification message from an authentication system associated with the real-time transaction system;
        receiving, at the API system from the authentication system, an authentication response;
        transmitting, using the API system and including the authentication response, one or more API calls to one or more matching scheme notification systems of a reconciliation system associated with the real-time transaction system;
        transmitting, using the reconciliation system, a payment notification topic stream to a payment notification handler associated with the real-time transaction system;
        retrieving, from a transaction query system and using the payment notification handler, transaction details associated with the payment request;
        transmitting, based on the transaction details and via an event-topic stream, a generated status message to one or more microservices of a transaction processor; and
        generating, based on the generated status message, a transaction activity user interface.

9. The real-time transaction system of claim 8, wherein the transaction notification message comprises an indication of one of: a failed transaction, a rejected transaction, a pending transaction, and settled transaction.

10. The real-time transaction system of claim 8, wherein the predetermined protocol is one of: an OAuth2 protocol or an SFTP push/pull protocol.

11. The real-time transaction system of claim 8, wherein the transmitting the payment notification topic stream comprises transmitting the payment notification topic stream via a Kafka stream.

12. The real-time transaction system of claim 8, wherein the transaction activity user interface comprises information associated with statuses of transactions and wherein the information is contained within one of: a failed transaction table, a rejected transaction table, a pending transaction table.

13. The real-time transaction system of claim 8, further comprising:
    receiving, from the user and at the transaction activity interface, a status request from the user; and
    obtaining, based on the received status request, one or more real-time statuses of one or more transaction requests.

14. The real-time transaction system of claim 13, further comprising:
    receiving, from the user and at the transaction activity user interface, a modification request to alter the transaction request; and
    implementing, based on the modification request, an alteration to the transaction request.

15. A non-transitory computer-readable medium storing instructions for executing a real-time transaction, the instructions, when executed by one or more processors, causing the one or more processors to perform operations comprising:

receiving, at an API system associated with the real-time transaction system, a transaction notification message associated with a payment request made by a user;

requesting, by the API system and via utilization of a predetermined protocol, authentication of the transaction notification message from an authentication system associated with the real-time transaction system;

receiving, at the API system from the authentication system, an authentication response;

transmitting, using the API system and including the authentication response, one or more API calls to one or more matching scheme notification systems of a reconciliation system associated with the real-time transaction system;

transmitting, using the reconciliation system, a payment notification topic stream to a payment notification handler associated with the real-time transaction system;

retrieving, from a transaction query system and using the payment notification handler, transaction details associated with the payment request;

transmitting, based on the transaction details and via an event-topic stream, a generated status message to one or more microservices of a transaction processor; and generating, based on the generated status message, a transaction activity user interface.

16. The non-transitory computer-readable medium of claim 15, wherein the transaction notification message comprises an indication of one of: a failed transaction, a rejected transaction, a pending transaction, and settled transaction.

17. The non-transitory computer-readable medium of claim 15, wherein the predetermined protocol is one of: an OAuth2 protocol or an SFTP push/pull protocol.

18. The non-transitory computer-readable medium of claim 15, wherein the transaction activity user interface comprises information associated with statuses of transactions and wherein the information is contained within one of: a failed transaction table, a rejected transaction table, a pending transaction table.

19. The non-transitory computer-readable medium of claim 15, further comprising:

receiving, from the user and at the transaction activity interface, a status request from the user; and obtaining, based on the received status request, one or more real-time statuses of one or more transaction requests.

20. The non-transitory computer-readable medium of claim 19, further comprising:

receiving, from the user and at the transaction activity user interface, a modification request to alter the transaction request; and implementing, based on the modification request, an alteration to the transaction request.

* * * * *